H. S. SALISBURY
VALVE MECHANISM.
APPLICATION FILED AUG. 4, 1915

1,198,585. Patented Sept. 19, 1916.

INVENTOR
HERBERT S. SALISBURY
BY
ATT'YS.

UNITED STATES PATENT OFFICE.

HERBERT S. SALISBURY, OF WALTHAM, MASSACHUSETTS.

VALVE MECHANISM.

1,198,585.  Specification of Letters Patent.  Patented Sept. 19, 1916.

Application filed August 4, 1915. Serial No. 43,595.

*To all whom it may concern:*

Be it known that I, HERBERT S. SALISBURY, a citizen of the United States, and resident of Waltham, in the county of Middlesex and State of Massachusetts, have invented certain new and useful Improvements in Valve Mechanism, of which the following is a specification.

The object of the present invention is to provide means for keeping a slide valve pressure-tight without the use of packing.

The invention as illustrated by the accompanying drawings is embodied in anti-friction rollers and raceways for the latter, said rollers being arranged to bear against the valves, and the raceways being arranged to maintain pressure of the rollers against the valves to keep the latter pressed against their seats. The rollers are arranged to roll upon the raceways and upon the valves as the latter move on their seats. The raceways are adjustable toward the valve seats, and adjusting devices are provided to set them to cause the desired degree of pressure of the valves against their seats.

Figure 1:
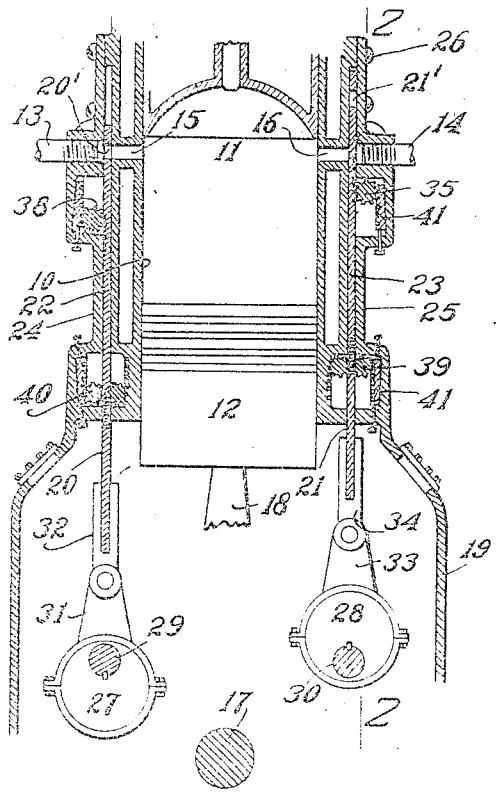
Figure 2:
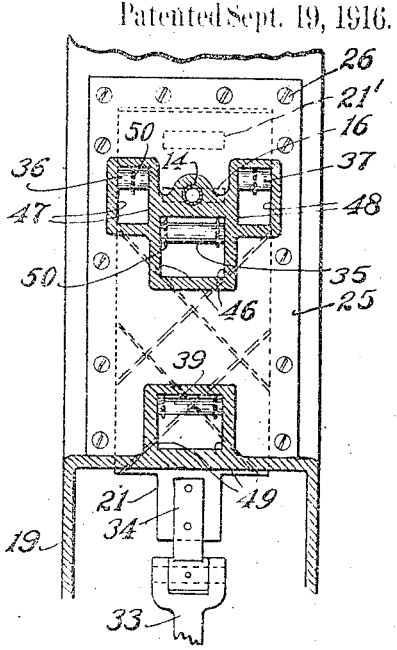
Figure 3:
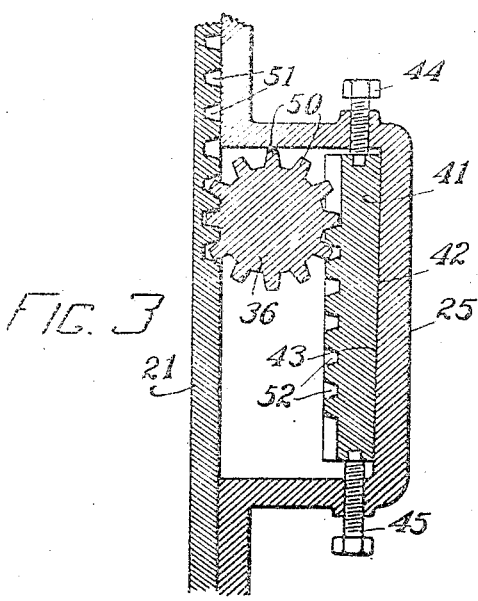
Figure 4:
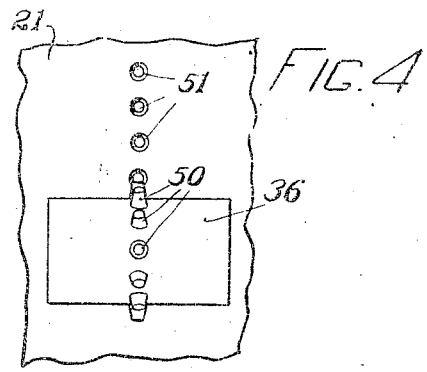

Of the accompanying drawings, which illustrate one form in which the invention may be embodied: Figure 1 represents a longitudinal section through the pressure cylinder of an internal combustion engine, the latter being provided with slide valves and with devices for keeping said valves pressed against their seats; Fig. 2 represents a sectional view through the structure intersected by line 2—2 of Fig. 1; Fig. 3 represents a sectional view on a larger scale of one of the devices included in Fig. 1, for keeping the valve pressed against its seat; Fig. 4 represents an elevation of a fragment of a slide valve and an anti-friction roller in coöperative relation thereto.

The same reference characters indicate the same parts wherever they occur.

It is to be understood that this invention is applicable to slide valves without regard to the character of the fluid which is to be controlled, and although the drawings illustrate the invention as embodied in an internal combustion engine, it will be understood that it is capable of being embodied in a steam engine, or compressed air engine, or other engine which is operated by fluid pressure.

The engine as shown by Fig. 1 comprises a pressure cylinder 10, the combustion chamber of which is indicated at 11, the piston is indicated at 12, an intake pipe is indicated at 13, and an exhaust pipe is indicated at 14, communication between said pipes and the combustion chamber being afforded by ports 15 and 16 respectively, extending through the wall of the cylinder. The crank shaft is indicated at 17, although no crank is shown, and a portion of a connecting rod is indicated at 18.

The passage of gases through the ports 15 and 16 is controlled by slide valves 20 and 21 respectively. In the present instance these valves are flat plates, and the lower end of each one projects into the crank case 19. The seats for the valves 20 and 21 are indicated respectively at 22 and 23. The valves are inclosed by cover plates 24 and 25 respectively, the latter being detachable and held in place in the present instance by screws 26. The valve 20 is provided with a port 20' which is moved into register with the pipe 13 and port 15 to admit fresh charges into the combustion chamber. The valve 21 is provided with a port 21' which is moved into register with the port 16 and pipe 14 to permit escape of the burnt charges. The valves are reciprocated vertically by eccentrics 27 and 28 respectively. The eccentric 27 is carried by a continuously driven shaft 29, and the eccentric 28 is carried by a continuously driven shaft 30.

I have not shown any means for driving the shafts 29 and 30, but in practice they would be driven by the shaft 17 through suitable gearing. Eccentric 27 is connected with valve 20 by an eccentric rod 31 and a coupling member 32, and eccentric 28 is connected with valve 21 by an eccentric rod 33 and coupling member 34.

In order to sustain the pressure in the combustion chamber, it is necessary to prevent leakage by the valves 20 and 21. It has been customary hitherto to use packing in conjunction with the valves to prevent said leakage, but my present invention renders packing unnecessary. Instead of using packing I provide anti-friction rollers arranged to bear against the valves and keep the valves pressed against their seats. As shown by Fig. 2, three anti-friction rollers 35, 36 and 37 are arranged adjacent the exhaust pipe 14, roller 35 being arranged under said pipe and rollers 36 and 37 being arranged at opposite sides of the pipe. The roller 35 appears also in Fig. 1. These rollers all bear against the outer side of the valve 21 and are held against the valve with pressure to keep the valve pressed against its seat. Similar rollers are arranged to keep the valve 20 pressed against its seat. One of the rollers for the valve 20 is indicated at 38 in Fig. 1, and an arrangement of rollers as shown by Fig. 2 is duplicated for the valve 20. It is therefore unnecessary to illustrate all the rollers for the valve 20. The lower portions of the valves are pressed against their seats by additional rollers, such roller for valve 21 being indicated at 39 and that for valve 20 being indicated at 40. The pressure of the rollers against their respective valves is maintained by raceways, the raceway 41 for roller 35 being shown best by Fig. 3. Each roller 35, 36, 37, 39, and each corresponding roller for the valve 20 has a similar raceway, and the showing of raceway 41 will suffice for all. In order to maintain the desired degree of pressure of the valves against their seats the several raceways are provided with adjusting means, as shown by Fig. 3. The right-hand surface 42 of the raceway is seated against a surface 43 formed upon the cover plate 25. These surfaces are inclined with relation to the lines of movement of the valve, the raceway being wedge-shaped, although the degree of inclination is very slight. The upper and lower ends of the raceway are engaged by set screws 44 and 45 respectively. A downward movement of the raceway will adjust the roller 35 toward the left, and by setting both the screws downwardly the raceway may be brought to bear against the roller with any desired degree of pressure. As the valves move on their seats the rollers roll upon the valves and likewise upon the raceways, without appreciable friction. The axes of the rollers are maintained at right angles to the lines of movement of the valves by sockets formed in the cover plates for the reception of the rollers. Referring to Fig. 2, the guiding surfaces for the roller 35 are indicated at 46, those for roller 36 are indicated at 47, those for roller 37 are indicated at 48, and those for roller 39 are indicated at 49.

The several pressure rollers as shown are provided with substantially conoidal shaped spurs 50 which enter correspondingly shaped sockets 51 and 52 formed in the valves and raceways respectively. The outer ends of the spurs do not seat in the bottoms of the sockets and do not therefore play any part in maintaining the valves against their seats. The function of the spurs is to insure rolling action of the rollers as the valves are moved and assist in longitudinally positioning said rollers. This guards against wearing flat spots on the rollers, as might otherwise occur if the rollers should fail to roll when the valve is moving.

Having described my invention, I claim:

1. Valve mechanism for a fluid-pressure cylinder, comprising a slide valve, a seat for said valve, a roller arranged to bear against said valve on the opposite side of the latter with reference to said seat, a raceway arranged to bear against said roller to keep the latter against said valve, a stationary abutment arranged to contact with and support said raceway substantially the entire length thereof, the contacting faces of said raceway and said abutment being inclined with reference to the lines of movement of said valve, and means arranged to adjust said raceway relatively to said abutment to keep said valve pressed against said seat, said roller being arranged to roll upon said raceway and upon said valve as the latter is moved on said seat.

2. Valve mechanism comprising a slide valve, a seat for said valve, a roller arranged to bear against said valve on the opposite side with reference to said seat, a raceway arranged to bear against said roller to keep said valve pressed against said seat, said roller having conoidal shaped spurs on its periphery, and said valve and said raceway having correspondingly shaped spur-receiving sockets, said spurs and said sockets being arranged to cause a positive rolling action of said roller on said valve and on said raceway in consequence of sliding movement of said valve, and to prevent a longitudinal movement of said roller.

3. Valve mechanism for a fluid-pressure cylinder, comprising a slide valve, a seat for said valve, a roller arranged to bear against said valve on the opposite side of the latter with reference to said seat, a raceway arranged to bear against said roller to keep the latter against said valve, the outer face of said raceway being inclined with relation to the lines of movement of said valve, an inclined stationary support for said raceway arranged to engage substantially the entire extent of said raceway, and screws arranged to engage opposite ends of said raceway to adjust the same on said inclined support toward and away from said seat.

In testimony whereof I have affixed my signature.

HERBERT S. SALISBURY.